United States Patent
Mihalache

(10) Patent No.: US 10,218,285 B2
(45) Date of Patent: Feb. 26, 2019

(54) MEDIUM VOLTAGE HYBRID MULTILEVEL CONVERTER AND METHOD FOR CONTROLLING A MEDIUM VOLTAGE HYBRID MULTILEVEL CONVERTER

(71) Applicant: SIEMENS AKTIENGESELLSCHAFT, München (DE)

(72) Inventor: Liviu Mihalache, Valencia, PA (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 407 days.

(21) Appl. No.: 14/886,496

(22) Filed: Oct. 19, 2015

(65) Prior Publication Data

US 2017/0110977 A1    Apr. 20, 2017

(51) Int. Cl.
*H02P 6/00* (2016.01)
*H02M 5/458* (2006.01)
(Continued)

(52) U.S. Cl.
CPC ........... *H02M 5/4585* (2013.01); *H02M 1/12* (2013.01); *H02M 7/49* (2013.01); *H02M 7/501* (2013.01); *H02M 7/5395* (2013.01); *H02P 27/08* (2013.01)

(58) Field of Classification Search
CPC ........ H02M 5/4585; H02M 1/12; H02M 7/49; H02M 7/501; H02P 27/08
(Continued)

(56) References Cited

U.S. PATENT DOCUMENTS 6,040,990 A    3/2000  Courault
7,230,837 B1    6/2007  Huang et al.
(Continued)

FOREIGN PATENT DOCUMENTS

CA    2663324 A1    10/2010
CN    1744420 A    3/2006
(Continued)

OTHER PUBLICATIONS

Radha Sree K et al: "Asymmetric cascaded Multilevel Inverter for electric vehicles", 2012 International Conference on Advances in Engineering, Science and Management ( ICAESM 2012) . . . Nagapattinam, Tamil Nadu, India, Mar. 30-31, 2012, IEEE, Piscataway, NJ, Mar. 30, 2012 (Mar. 30, 2012), pp. 758-763, XP032185563, ISBN: 978-1-4673-0213-5 the whole document / Mar. 30, 2012.
(Continued)

*Primary Examiner* — Eduardo Colon Santana
*Assistant Examiner* — Gabriel Agared

(57) ABSTRACT

A multilevel converter includes a power supply assembly with a plurality of phases, and a power cell assembly with first power cells and second power cells. The first power cells and second power cells have a same topology and a same current rating, and supply power to the plurality of phases of the power supply assembly. Each phase of the plurality of phases includes a first power cell and a second power cell of the power cell assembly, voltage ratings of the first power cells and the second power cells being different. Furthermore, a method for controlling a multilevel converter and an electric drive system comprising a multilevel converter are disclosed.

8 Claims, 10 Drawing Sheets

(51) Int. Cl.
*H02P 27/08* (2006.01)
*H02M 1/12* (2006.01)
*H02M 7/49* (2007.01)
*H02M 7/501* (2007.01)
*H02M 7/5395* (2006.01)

(58) Field of Classification Search
USPC .................................................. 318/400.29
See application file for complete search history.

(56) References Cited

U.S. PATENT DOCUMENTS

| | | | |
|---|---|---|---|
| 9,787,213 B2* | 10/2017 | Wei | H02M 5/458 |
| 2006/0044857 A1 | 3/2006 | Lemak | |
| 2008/0144342 A1 | 6/2008 | Du et al. | |
| 2008/0218320 A1* | 9/2008 | Jang | H02M 7/49 363/1 |
| 2009/0102436 A1 | 4/2009 | Escobar Valderrama et al. | |
| 2009/0237962 A1* | 9/2009 | Yun | H02M 5/458 363/37 |
| 2010/0072824 A1* | 3/2010 | Abolhassani | H02M 7/49 307/82 |
| 2010/0073970 A1* | 3/2010 | Abolhassani | H01F 30/12 363/37 |
| 2010/0213921 A1* | 8/2010 | Abolhassani | H01F 27/385 323/328 |
| 2014/0042817 A1* | 2/2014 | Zargari | H02M 1/32 307/72 |
| 2014/0307497 A1* | 10/2014 | Yoo | H02M 7/483 363/131 |
| 2014/0376287 A1* | 12/2014 | Narimani | H02M 3/07 363/60 |
| 2015/0009731 A1* | 1/2015 | Kim | H02M 7/49 363/59 |
| 2015/0171733 A1* | 6/2015 | Zargari | H02M 1/32 307/52 |
| 2015/0200602 A1* | 7/2015 | Narimani | H02M 5/4585 363/37 |

FOREIGN PATENT DOCUMENTS

| | | |
|---|---|---|
| CN | 101030733 A | 9/2007 |
| CN | 101483392 A | 7/2009 |
| CN | 101494425 A | 7/2009 |
| CN | 101505106 A | 8/2009 |
| CN | 201378803 Y | 1/2010 |
| CN | 101699765 A | 4/2010 |
| CN | 101707374 A | 5/2010 |
| CN | 101753053 A | 6/2010 |
| CN | 201563101 U | 8/2010 |
| CN | 102005957 A | 4/2011 |
| CN | 102005959 A | 4/2011 |
| CN | 102097967 A | 6/2011 |
| CN | 102222925 A | 10/2011 |
| CN | 102332839 A | 1/2012 |
| CN | 202110229 U | 1/2012 |
| CN | 102545680 A | 7/2012 |
| CN | 102593866 A | 7/2012 |
| CN | 102594192 A | 7/2012 |
| CN | 202309530 U | 7/2012 |
| CN | 102694385 A | 9/2012 |
| CN | 102751891 A | 10/2012 |
| CN | 202475298 U | 10/2012 |
| CN | 202535087 U | 11/2012 |
| CN | 202535306 U | 11/2012 |
| CN | 102832635 A | 12/2012 |
| CN | 202817756 U | 3/2013 |
| CN | 103036459 A | 4/2013 |
| CN | 103123664 A | 5/2013 |
| CN | 103219896 A | 7/2013 |
| CN | 203104278 U | 7/2013 |
| CN | 103236800 A | 8/2013 |
| CN | 103312246 A | 9/2013 |
| CN | 103337862 A | 10/2013 |
| CN | 103457478 A | 12/2013 |
| CN | 103532153 A | 1/2014 |
| CN | 203398793 U | 1/2014 |
| CN | 103580050 A | 2/2014 |
| CN | 103593521 A | 2/2014 |
| CN | 103633874 A | 3/2014 |
| CN | 103762856 A | 4/2014 |
| CN | 203537247 U | 4/2014 |
| CN | 103825478 A | 5/2014 |
| CN | 103986308 A | 8/2014 |
| CN | 203788186 U | 8/2014 |
| CN | 104022629 A | 9/2014 |
| CN | 104135180 A | 11/2014 |
| CN | 104158212 A | 11/2014 |
| CN | 104218563 A | 12/2014 |
| CN | 104242720 A | 12/2014 |
| CN | 204046177 U | 12/2014 |
| CN | 204206015 U | 3/2015 |
| JP | 2012044839 A | 3/2012 |
| JP | 2014018028 A | 1/2014 |
| KR | 100823725 B1 | 4/2008 |
| PL | 394348 A | 10/2012 |
| UA | 54953 U | 11/2010 |
| UA | 56686 U | 1/2011 |
| WO | 2010145692 A1 | 12/2010 |
| WO | 2011129223 A1 | 10/2011 |
| WO | 2011160678 A1 | 12/2011 |
| WO | 2013030236 A2 | 3/2013 |
| WO | 2013104418 A1 | 7/2013 |
| WO | 2015007186 A1 | 1/2015 |
| WO | 2014118010 A3 | 3/2015 |
| WO | 2015041691 A1 | 3/2015 |
| WO | 2015044432 A1 | 4/2015 |

OTHER PUBLICATIONS

Rodriguez J et al: "Multilevel Converters: An Enabling Technology for High-Power Applications", Proceedings of the IEEE, IEEE. New York, US, vol. 97, No. 11, pp. 1786-1817, XP011278598, ISSN: 0018-9219, DOI: 10.1109/JPROC2009.2030235, paragraph VI.A, paragraph IV.B / Nov. 1, 2009.

PCT International Search Report and Written Opinion of International Searching Authority dated Feb. 6, 2017 corresponding to PCT International Application No. PCT/US2016/055284 filed Oct. 4, 2016.

Bharatkar, S.S.; Bhoyar, R.R.; Khadtare, S.A., Analysis of three phase cascaded H-bridge multilevel inverter for symmetrical & asymmetrical configuration, Date of Conference: Feb. 1-2, 2014, pp. 1-7, ISBN: 978-1-4799-3893-3, Published in: 2014 First International Conference on Automation, Control, Energy and Systems (ACES); India.

Kenichiro Sano, and Masahiro Takasaki, A Transformerless D-STATCOM Based on a Multivoltage Cascade Converter Requiring No DC Sources, Jun. 6, 2012, pp. 2783-2795, vol. 27.

* cited by examiner

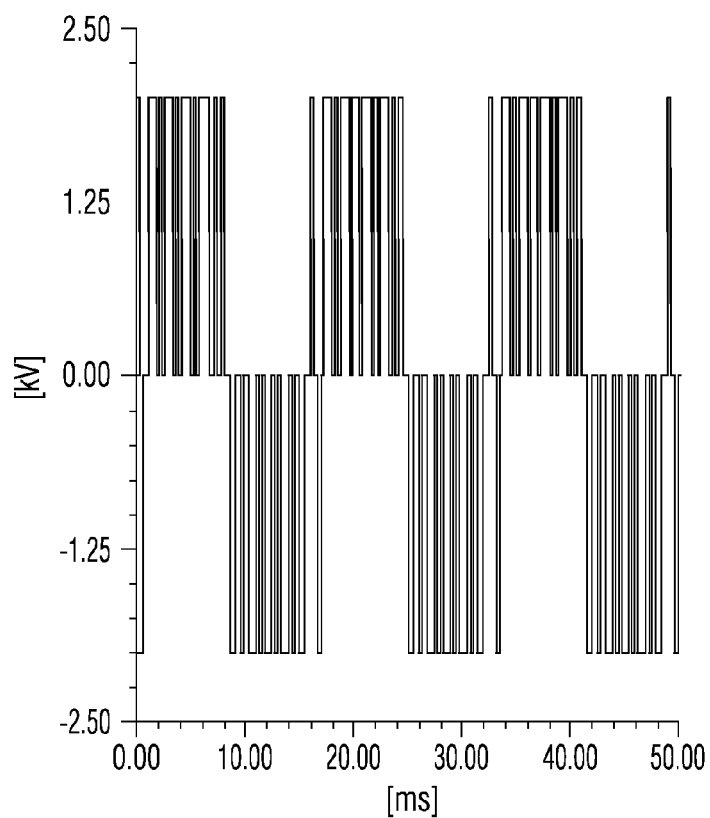
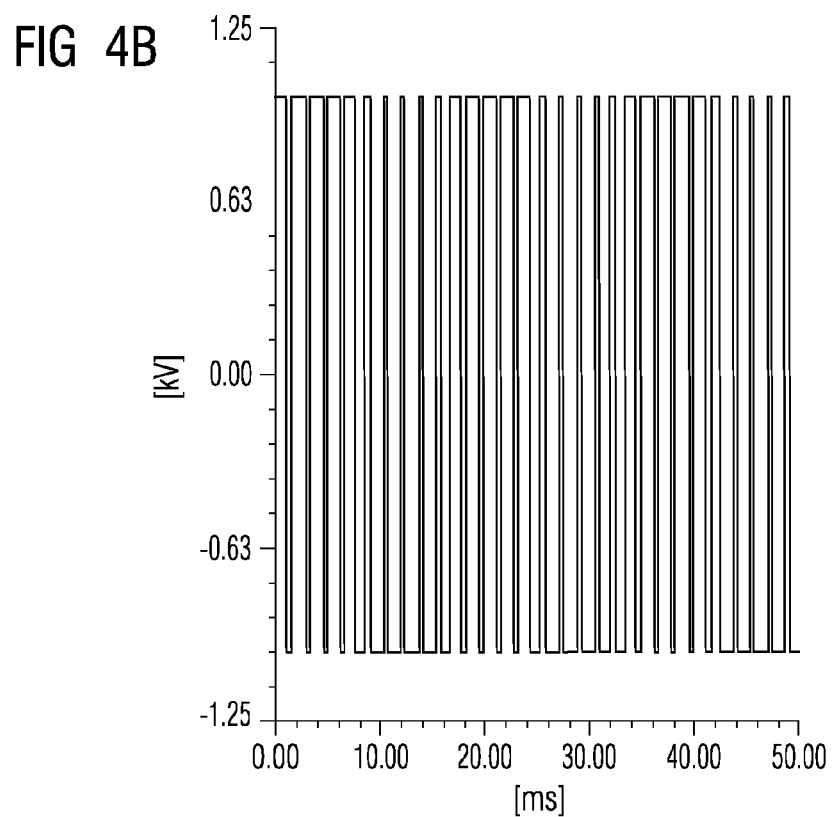

MEDIUM VOLTAGE HYBRID MULTILEVEL CONVERTER AND METHOD FOR CONTROLLING A MEDIUM VOLTAGE HYBRID MULTILEVEL CONVERTER

BACKGROUND

1. Field

Aspects of the present invention generally relate to a medium voltage hybrid multilevel converter and a method for controlling a medium voltage hybrid multilevel converter.

2. Description of the Related Art

Traditionally, multilevel power converters are used in the applications of medium voltage AC drives, flexible AC transmission systems (FACTS), and High Voltage DC (HVDC) transmission systems, because single power semiconductor devices cannot handle high voltage. Multilevel converters typically include a plurality of power cells for each phase, each power cell including an inverter circuit having semiconductor switches that are capable of altering voltage states or levels of the individual cells. Depending on the type of inverter circuitry used, e.g., half-bridge or full bridge, each power cell may have one or more switching legs. By controlling switching events of the individual switching legs of each power cell, it is possible to control the voltage across each cell and resultantly obtain an AC output waveform having multiple discrete voltage levels. A multilevel converter is often described by the number of discrete levels in output voltage waveform.

A cascaded multilevel converter is a preferred topology in many medium and high voltage applications. In some cases however, it may require a large number of cells to achieve a desired output voltage level, which contributes to an overall system price increase. An option to solve this problem is to increase the voltage level of each individual cell, thus reducing the number of cells required for the system to achieve a certain output voltage. One drawback with this approach is that systems built with higher voltage cells are optimized in terms of cell count for certain output voltage levels, but they may not be optimized for other output voltage levels.

Cascaded multilevel converters are generally built with identical cells, i.e. same cell topology with the same voltage and same current ratings. A different approach is to use cells with different topologies and different voltage and current ratings, the so called hybrid topologies. In this case, typically the cell with the higher voltage is switched at low (fundamental) frequency while the cells with the lower voltage ratings are switched at higher frequency. This traditional approach suffers from two drawbacks: the high voltage cells will experience unequal losses among themselves and depending on the modulating approach and load conditions, the low voltage cells may have to absorb excess energy from the higher voltage cell.

SUMMARY

Briefly described, aspects of the present invention relate to a cascaded hybrid multilevel converter, an electric drive system comprising a cascaded hybrid multilevel converter, and a method for controlling a cascaded hybrid multilevel converter.

A first aspect of the present invention provides a multilevel converter comprising a power supply assembly comprising a plurality of phases; and a power cell assembly comprising first power cells and second power cells, the first power cells and second power cells comprising a same topology and a same current rating, wherein the first power cells and the second power cells supply power to the plurality of phases of the power supply assembly, and wherein each phase of the plurality of phases comprises at least one first power cell and a second power cell of the power cell assembly, voltage ratings of the first power cells and the second power cells being different.

A second aspect of the present invention provides a method for controlling a multilevel converter comprising switching a plurality of switching devices of a power cell assembly by generating pulse width modulation signals based upon a plurality of carrier signals compared to a reference signal, wherein the plurality of switching devices are switched at a same switching frequency.

A third aspect of the present invention provides an electric drive system comprising a power source; and a multilevel converter coupled to the power source for producing a multi-phase power supply, the converter comprising a power supply assembly comprising a plurality of phases producing the multi-phase power supply, and a power cell assembly comprising first power cells and second power cells, the first power cells and second power cells comprising a same topology and a same current rating, the first power cells and the second power cells supplying power to the plurality of phases of the power supply assembly, and each phase of the plurality of phases comprising at least one first power cell and a second power cell of the power cell assembly, voltage ratings of the first power cells and the second power cells being different.

BRIEF DESCRIPTION OF THE DRAWINGS

FIGS. 4a, 4b and 4c illustrate graphical representations of a simulated voltage waveforms obtained with PSPWM in a cascaded H-bridge multilevel converter 10 for a high voltage cell, a low voltage cell and a resulting phase voltage for one phase A, B or C, respectively, in accordance with an exemplary embodiment of the present invention.

DETAILED DESCRIPTION

To facilitate an understanding of embodiments, principles, and features of the present invention, they are explained hereinafter with reference to implementation in illustrative embodiments. In particular, they are described in the context of being a cascaded hybrid multilevel converter, an electric drive system comprising such a cascaded hybrid multilevel converter, and a method for controlling such a multilevel converter. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Figure 1:
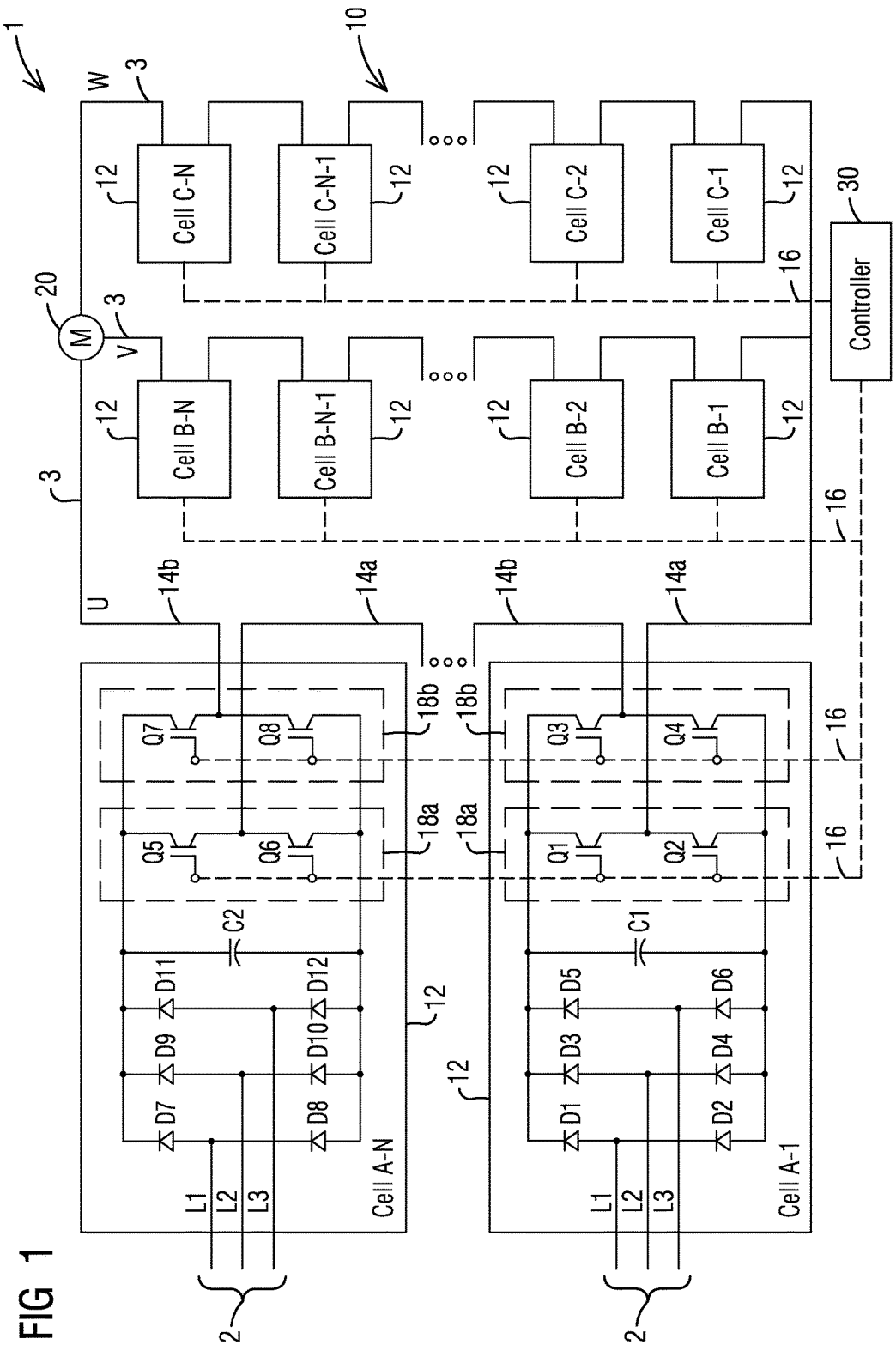
FIG. 1 illustrates a schematic of an embodiment of a system comprising a standard cascaded H-bridge multilevel converter in accordance with an exemplary embodiment of the present invention.

FIG. 1 illustrates a schematic of an embodiment of a system 1 comprising a standard cascaded H-bridge multilevel converter 10, including three phases with a plurality of power cells 12, for example two power cells, per phase. The system 1 further comprises a pulse width modulation (PWM) controller 30 and a motor 20. The topology of the present embodiment of the multilevel converter is described for example in the U.S. Pat. No. 5,625,545, the content of which is incorporated by reference herein for illustrative purposes.

In the example of FIG. 1, the system 1 is a medium voltage drive, for example a 4160V medium voltage drive, comprising a three-phase power source providing an alternating current (AC) power input 2 via lines L1, L2 and L3. The multilevel converter 10 is connected to the AC power input 2 and produces a three-phase AC power supply as output 3, via phase output lines U, V and W. The AC output 3 via lines U, V, and W may be connected to a load, which in this example comprises the motor 20. The motor 20 may be operated by controlling the frequency and/or amplitude of the output voltage produced by the multilevel converter 10.

Each phase of the multilevel converter 10 comprises a plurality of power cells 12 arranged in a cascaded manner. Each power cell 12 of a phase is connected to the power input 2 via respective input lines L1, L2 and L3. Power to the input lines L1, L2, L3 may be provided, for example, via a multi-phase winding transformer. The power cells 12 of one phase are connected in series, and are respectively labelled as Cell A-1, Cell A-N, Cell B-1, Cell B-2, Cell B-N-1, Cell B-N, Cell C-1, Cell C-2, Cell C-N-1, Cell C-N. Each power cell 12 is responsive to control signals from the PWM controller 30 to alter the voltage level and/or frequency output, resulting in a multilevel voltage waveform for each phase. The power cells 12 generally include power semiconductor switching devices, passive components (inductors, capacitors), control circuits, processors, interfaces, and other components for communicating with the controller 30. The power cells 12 operate based on signals from the controller 30.

Each of the power cells 12 include single-phase inverter circuitry connected to separate DC sources produced by a rectification of the AC power input for each power cell 12 via input lines L1, L2, L3. In this example, the rectification is carried out by diode rectifiers D1-D6 (Cell A-1) and D7-D12 (Cell A-N) arranged in bridge rectifier configurations. The present example also uses filtering circuitry including, for example, capacitors C1, C2, for smoothing out voltage ripples from the rectified DC power.

The inverter circuitry of each power cell 12 comprises power semiconductor switching devices Q1-Q4 (Cell A-1) and Q4-Q8 (Cell A-N) arranged in H-bridges (also referred to as full bridge) configuration. The switching devices Q1-Q8 may include, for example and without limitation, power transistors such as insulated-gate bipolar transistors (IGBT). The switching devices Q1, Q2 and Q5, Q6 connect to cell output line 14a while the switching devices Q3, Q4 and Q7, Q8 connect to cell output line 14b. The switching devices, e. g., transistors, Q1-Q8 receive pulse width modulation signals, for example, in the form of gate input signals 16, that are controlled by the controller 30 based on pulse width modulation.

The controller 30 selects either of transistors Q1 or Q2 (and Q5 or Q6) to be ON via a first switching leg 18a, and either of transistors Q3 or Q4 (and Q7 or Q8) to be ON via a second switching leg 18b, which will permit power to pass to the load 20 by way of the line 14a or 14b respectively. In other words, a controller-triggered switching event of the switching leg 18a causes one of the transistors Q1 or Q2 to be in an ON state and the other to be in OFF state. Likewise, a controller-triggered switching event of the switching leg 18b causes one of the transistors Q3 or Q4 to be in an ON state and the other to be in OFF state. In the embodiments illustrated, the switching legs 18a and 18b of an individual cell 12 are simply referred to as switching leg A and switching leg B of that particular cell 12.

The motor 20 may comprise any type AC-type motor, for example, synchronous, asynchronous, permanent magnet, and may be rated for low voltage, medium voltage or high-voltage. For example, medium-voltage AC motors, such as those used in industrial process control, may operate in the 4.16 kV to 13.8 kV range. Greater or lesser voltage may be used. More than one AC motor 20 may be connected. Other loads may be used instead of or in addition to the motor 20. The AC motor 20 responds to the voltage applied by the multilevel converter on the three phases, for example, to increase, decrease or maintain a speed or position.

The PWM controller 30 may comprise, for example, a processor with a memory, which is capable of storing and executing specific instructions to implement the illustrated PWM control. The controller 30 may be realised, for example and without limitation, by a microcontroller with internal or external memory, or by a fixed-point or floating-point digital signal processor (DSP), or by a programmable logic device (PLD), or any combination of the above mentioned. By pulse-width modulating the voltage reference for each phase, the controller 30 controls each of the power cells 12, and thus, the amplitude and frequency of the voltage output between the output lines 14a and 14b of each power cell 12. A control circuit or control board in a power cell 12 may receive the voltage reference and generate the gating pulses for power switching devices using appropriate vector controls and pulse-width modulation. Alternatively, the controller 30 may output the gating pulses provided to the cells 12 based on the voltage references.

Figure 2:
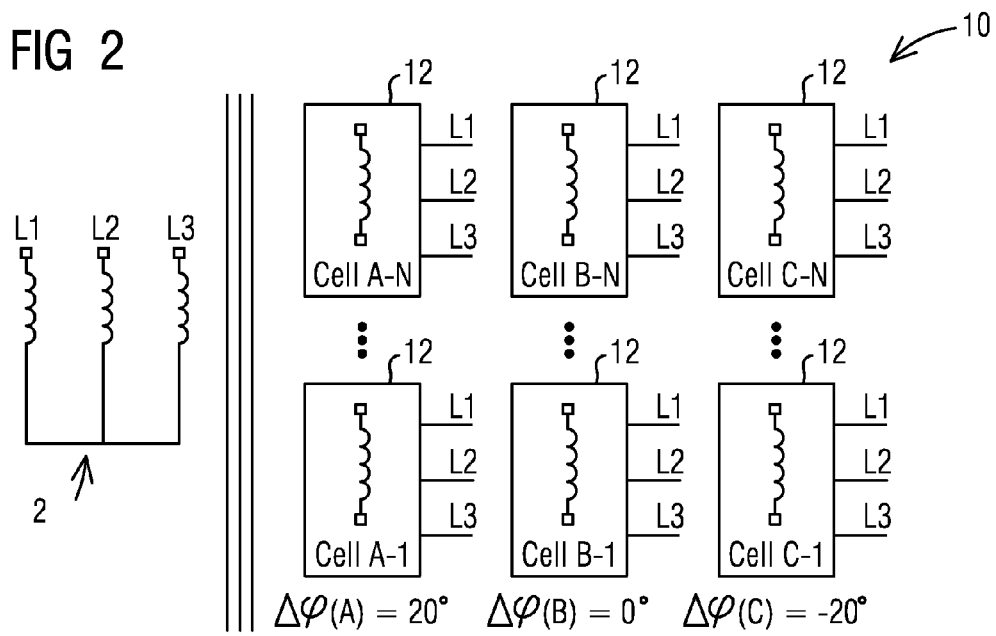
FIG. 2 illustrates a schematic of an embodiment of an arrangement of transformer windings for a topology of a hybrid multilevel converter in accordance with an exemplary embodiment of the present invention.

FIG. 2 illustrates a schematic of an embodiment of an arrangement of transformer windings for a topology of a hybrid multilevel converter 10, corresponding to the multilevel cascaded topology shown in FIG. 1, in accordance with an exemplary embodiment of the present invention.

According to an exemplary embodiment, the power cells 12 are configured as hybrid cells, i.e. cells having a same topology but different ratings. As described before in FIG. 1, the cascaded H-bridge multilevel converter 10 includes three phases, referred to for example as phase A, phase B, phase C, with a plurality of power cells 12, for example two power cells, per phase.

As the power cells 12 per each phase are connected in series, they all have a same current rating; however voltage ratings of the power cells 12 are different. Different from a traditional approach, on each phase, there are (N−1) first power cells 12, having for example a voltage rating of 2V (the first power cells are herein also referred to as high voltage cells), and one second power cell 12 with a voltage rating of V (the second power cells are herein also referred to as low voltage cells). Each high voltage cell outputs three levels (+2V, 0, −2V) and each low voltage cell outputs only two levels (+V, −V).

For example, an 18-pulse transformer with multiple windings provides isolated input voltage to each power cell 12. All power cells 12 of one phase A, B, C are powered up from the transformer windings with the same phase shift via input lines L1, L2, L3. For example, all cells 12 on phase A (Cell A-1, Cell A-N) comprise transformer windings comprising a 20 degrees phase shift (noted in FIG. 2 as Δφ(A)=20°); all cells 12 on phase B (Cell B-1, Cell B-N) comprise transformer windings comprising a 0 degrees phase shift (noted in FIG. 2 as Δφ(B)=0°), and all cells 12 on phase C (Cell C-1, Cell C-N) comprise transformer windings comprising a −20 degrees phase shift (noted in FIG. 2 as Δφ(C)=−20°). Such a winding distribution is shown in FIG. 2, corresponding to the multilevel cascaded topology shown in FIG. 1. All power cells 12 are switched at a same switching frequency.

Figure 3:
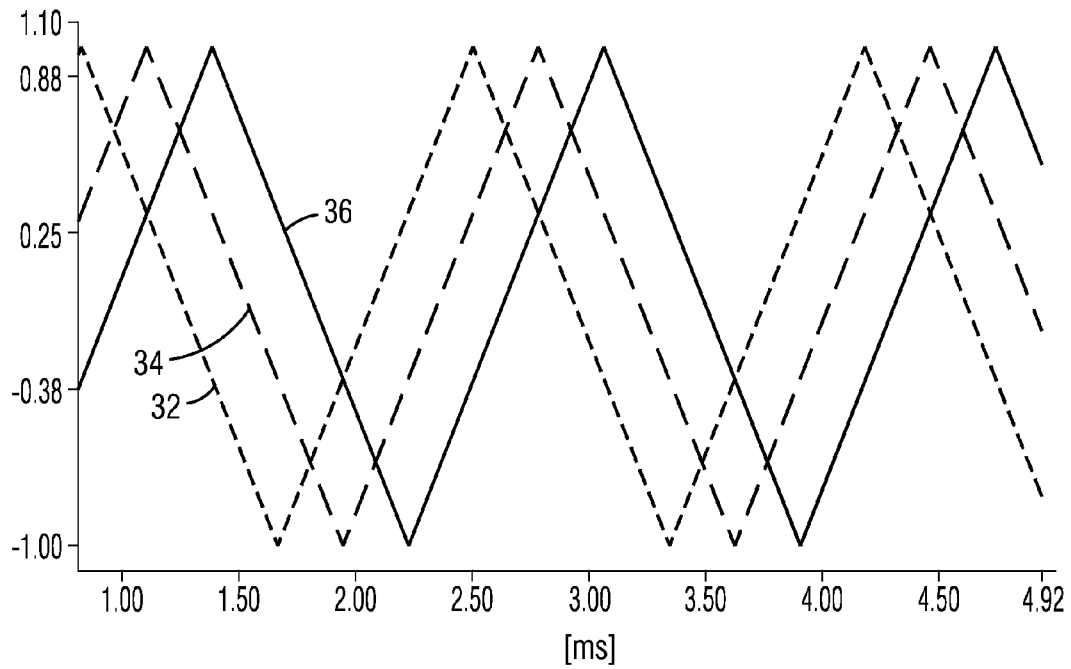
FIG. 3 illustrates a graphical representation of a simulated triangular carrier arrangement used for controlling two cells, one high voltage cell and one low voltage cell, in accordance with an exemplary embodiment of the present invention.

FIG. 3 illustrates a graphical representation of a simulated triangular carrier arrangement used for controlling two power cells 12, one high voltage cell and one low voltage cell, in accordance with an exemplary embodiment of the present invention. As previously noted in connection with the example of FIG. 1, the system 1 comprising the power cells 12 can be for example a 4160V medium voltage drive with a frequency of 60 Hz.

Each phase A, B, C is assigned a modulating reference signal, for example, having a sinusoidal waveform. For each switching leg 18a, herein also referred to as leg A, and 18b, herein also referred to as leg B, of the individual power cells 12, a carrier signal is allocated. A switching event, i.e. the switching ON or switching OFF of a switching device Q1-Q12 of the switching leg 18a, 18b is effected by a pulse width modulation signal, for example, as a gate input signal 16, which is triggered by the controller 30 based on a comparison of the carrier signal with the reference signal (see FIG. 1).

The phase-shifted PWM (PSPWM) carrier method is a preferred method used for a cascaded H-bridge topology such as described. Using the PSPWM carrier method, a sinusoidal waveform which is a reference for a particular cell 12, is compared against a substantially triangular carrier in order to obtain switching instances for leg A (see FIG. 1, switching leg 18a). The same reference sinusoidal waveform is compared against the inverted triangular carrier in order to obtain switching instances for leg B of the same cell 12 (see FIG. 1, switching leg 18b).

In an exemplary embodiment, a different phase shifting modulation scheme is used:
- Each leg of each high voltage cell, i.e., a first power cell 12, uses its own triangular carrier. The reference for leg B (see FIG. 1, leg 18b) is inverted with respect to the reference of leg A (see FIG. 1, leg 18a).
- A low voltage cell, i.e., a second power cell 12, uses only one carrier. For example, when each first power cell 12 of each phase in FIG. 1, i.e. Cell A-1, Cell B-1, Cell C-1, is a low voltage cell, switches Q1 and Q4 receive the same command signals. Similarly, switches Q2 and Q3 receive the same command signals which are inverted signals of Q1 and Q4.
- For a case where there are (N−1) high voltage cells 12 and one low voltage cell 12 per phase, there are a total of (2N−1) carriers on each phase A, B, C.
- The new phase shift between the cell carriers of one phase A, B, C is given by (1), where (N−1) is number of high voltage cells 12 and $T_s$ is the switching frequency used for all cells 12:

$$T_{shift} = \frac{T_S}{2 \cdot (2 \cdot N - 1)} \quad (1)$$

With reference to FIG. 3, the carriers 32, 34, 36 comprise triangular waveform, wherein carriers 32, 34 are the carriers used by a high voltage cell 12, and carrier 36 is used by a low voltage cell 12.

The described phase shift $T_{shift}$ ensures that an overall switching ripple of a phase voltage is equal to (2), wherein (N−1) is the number of high voltages cells 12 per phase and $F_s$ is a switching frequency of all cells 12, i.e., low and high voltage cells. An output voltage will only contain steps with magnitude of 2V. With such a modulation, a phase output voltage has 2N levels, i.e., always an even number, see (3).

$$F_{EQUIVALENT} = (2 \cdot N - 1) \cdot F_S \quad (2)$$

$$N_{PHASE\_LEVELS} = 2 \cdot N \quad (3)$$

Figure 4C:
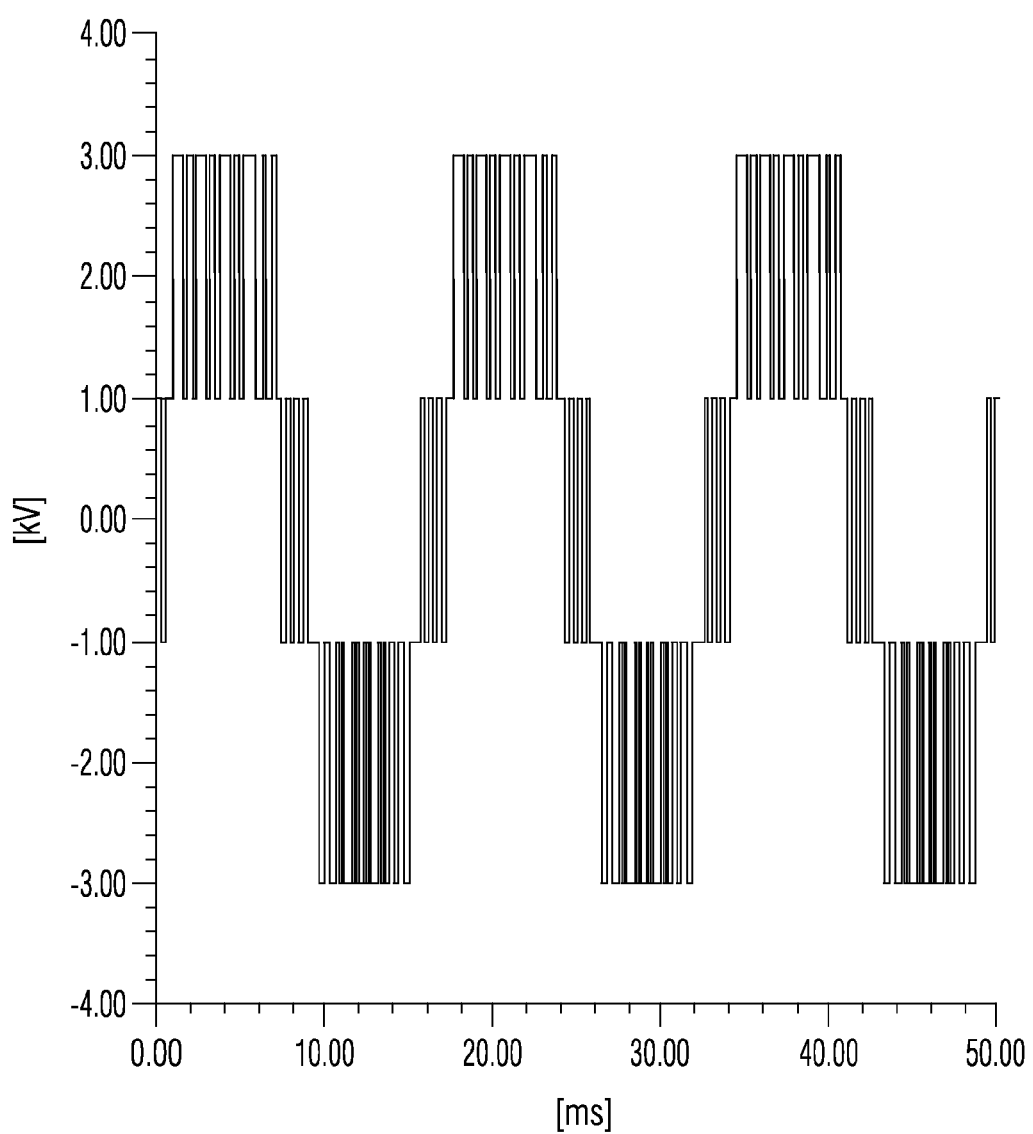

FIGS. 4a, 4b and 4c illustrate graphical representations of a simulated voltage waveforms obtained with PSPWM in a cascaded H-bridge multilevel converter 10 for a high voltage cell, a low voltage cell and a resulting phase voltage for one phase A, B or C, respectively, in accordance with an exemplary embodiment of the present invention. FIGS. 4a, 4b, 4c relate to a 4160V/60 Hz example system 1 (see FIG. 1).

FIG. 4a shows a graphical representation of a simulated voltage waveform obtained with PSPWM for a high voltage cell 12 of one phase A, B or C. As FIG. 4a shows, the high voltage cell switches with three levels (+2V, 0V, −2V). FIG. 4b shows a graphical representation of a simulated voltage waveform with PSPWM for a low voltage cell 12 of one phase A, B or C. As shown in FIG. 4b, the low voltage cell switches with only two levels (+1V, −1V). FIG. 4c shows a graphical representation of a simulated voltage waveform with PSPWM for a resulting phase voltage of one phase A, B or C, wherein voltage waveforms of the high voltage cell of FIG. 4a and low voltage cell of FIG. 4b are combined, i.e., added. FIG. 4c shows that, as N=2 (see equation (3) above, wherein N is the number of power cells 12), the resulting phase voltage has four levels and an equivalent switching frequency is three times a switching frequency of each switching device.

Figure 5:
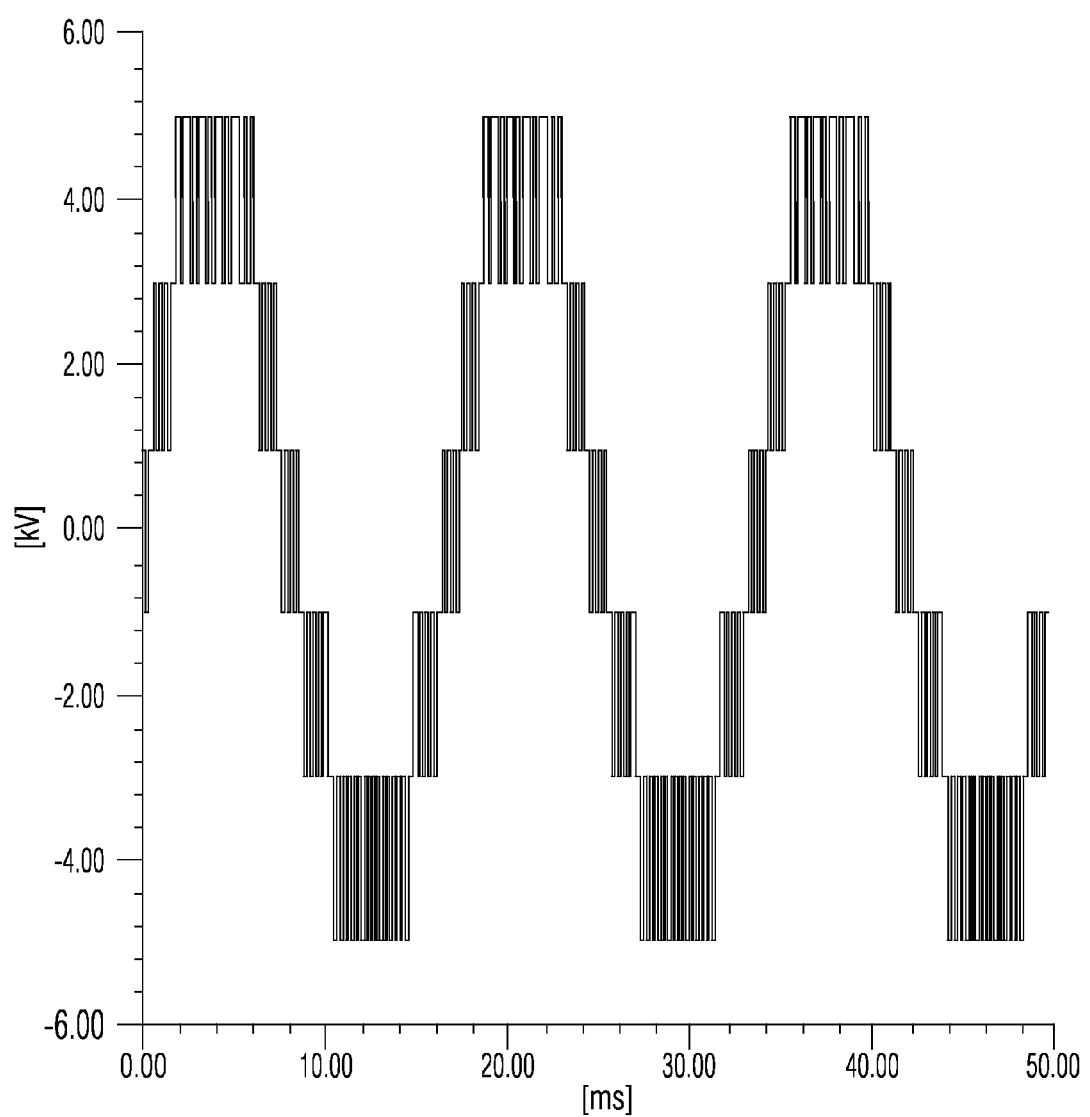
FIG. 5 and FIG. 6 illustrate graphical representations of simulated resulting phase voltages of one phase A, B or C, for different numbers of power cells, respectively, in accordance with an exemplary embodiment of the present invention.
Figure 6:
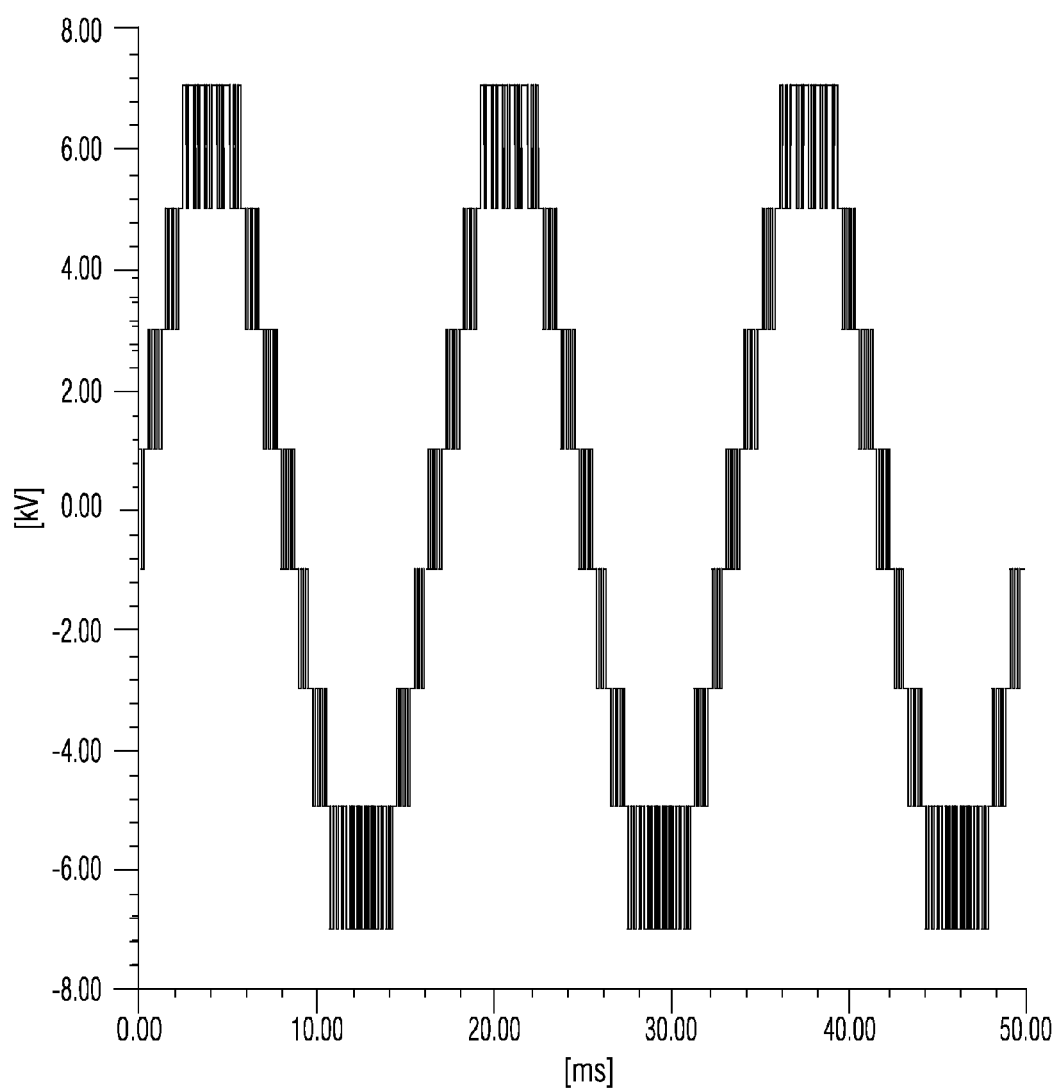

FIG. 5 and FIG. 6 illustrate graphical representations of simulated resulting phase voltages of one phase A, B or C, for different numbers of power cells 12, respectively, in accordance with an exemplary embodiment of the present invention. In the example of FIGS. 5-6, the graphical representations of simulated resulting phase voltages also relate to a 4160V/60 Hz example drive system 1 (see FIG. 1).

FIG. 5 illustrates a graphical representation of a simulated resulting phase voltage for one phase A, B, C comprising three power cells 12, i.e. N=3. According to this exemplary embodiment, each phase A, B, C comprises two high voltage cells and one low voltage cell, resulting in a six-level-phase voltage with an equivalent switching frequency which is five times the switching frequency of each switching device Q1-QN. FIG. 6 illustrates a graphical representation of a simulated resulting phase voltage of a phase A, B, C comprising four power cells 12, i.e. N=4. Thus, there are three high voltage cells and one low voltage cell, resulting in an eight-level-phase voltage with an equivalent switching frequency which is seven times the switching frequency of each switching device Q1-QN.

Figure 7:
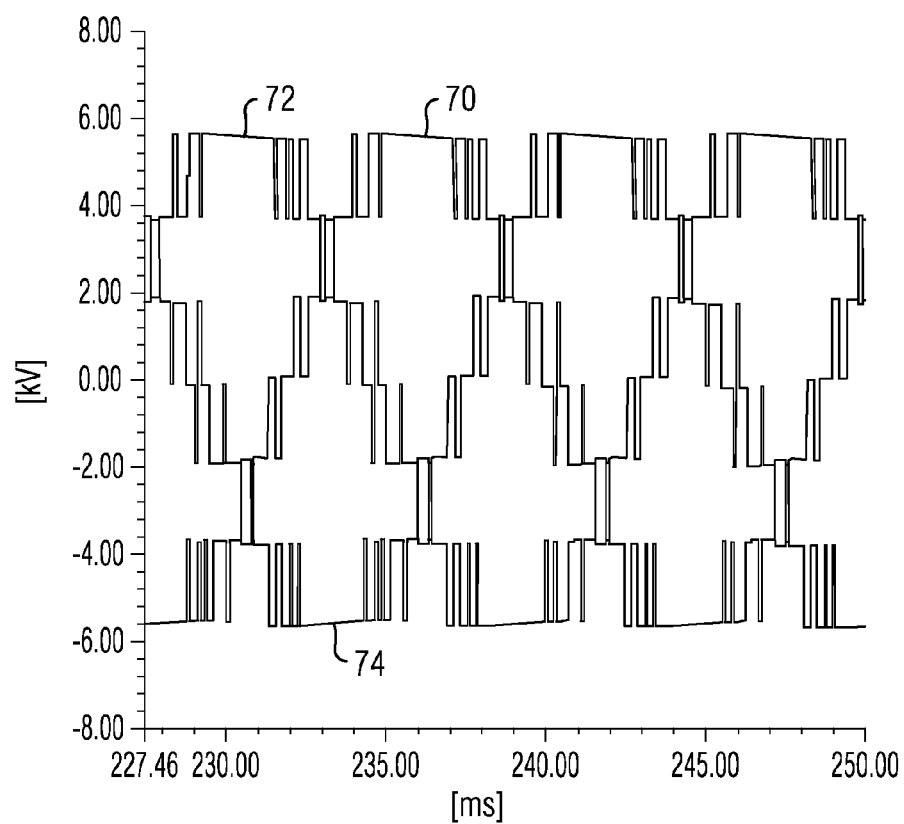
FIG. 7 and FIG. 8 illustrate graphical representations of a simulated line-line voltage waveform and a simulated output current obtained with PSPWM in a cascaded H-bridge multilevel converter 10 in accordance with an exemplary embodiment of the present invention.
Figure 8:
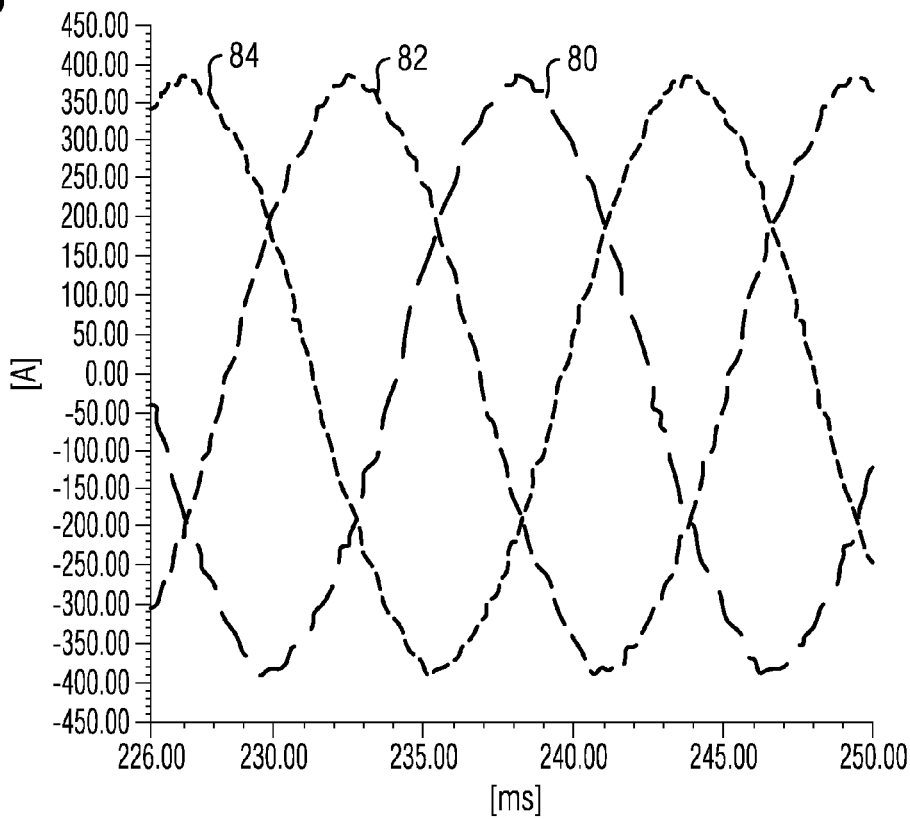

FIG. 7 and FIG. 8 illustrate graphical representations of a simulated line-line voltage waveform and a simulated output current obtained with PSPWM in a cascaded H-bridge multilevel converter 10 in accordance with an exemplary embodiment of the present invention. FIG. 7 illustrates simulated line-line voltage waveforms 70, 72, 74 in a cascaded H-bridge multilevel converter 10 for a three-phase-system comprising phases A, B and C. Each phase A, B, C comprises two power cells 12, i.e., N=2, with one high voltage cell and one low voltage cell per phase A, B, C (see FIG. 2). FIG. 8 illustrates simulated phase currents 80, 82, 84 obtained with PSPWM in the cascaded H-bridge multilevel converter 10 corresponding to the line-line voltage waveforms shown in FIG. 7.

With reference to FIGS. 7-8, according to an exemplary embodiment, a transformer input voltage can be for example 4160V, wherein an output voltage can also be 4160V. The winding distribution of the power cells 12 follows for example the winding arrangement as illustrated in FIG. 2. In this example, the one low voltage cell has an input voltage of 750V and an output current of 260 A rms. The example according to FIGS. 7-8 shows seven-level line-line voltage at overmodulation and output current at maximum load.

Figure 9:
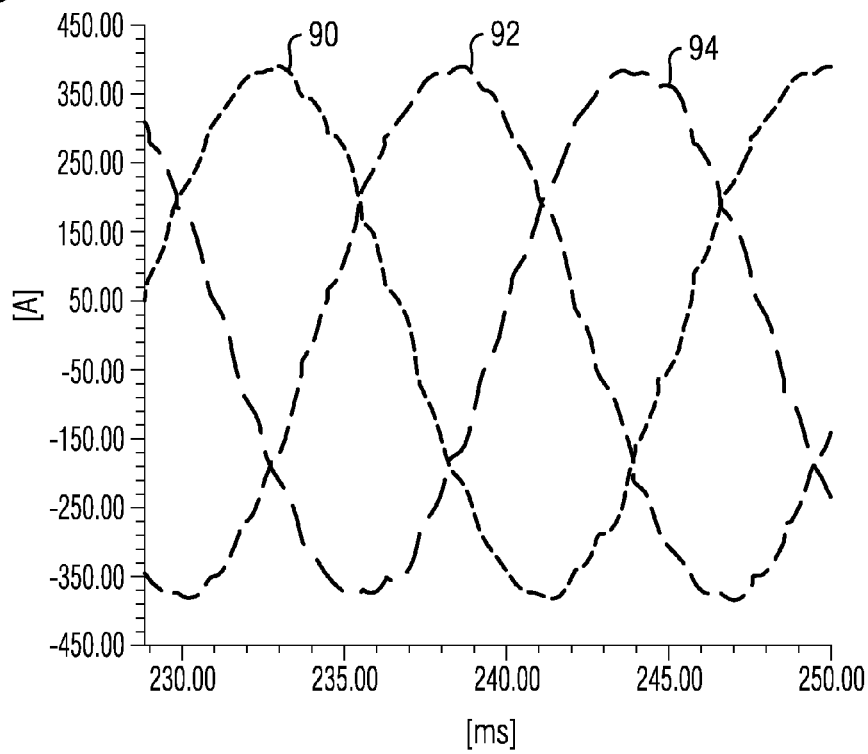
FIG. 9 and FIG. 10 illustrate graphical representations of simulated input currents and the total harmonic distortion (THD) obtained with PSPWM in a cascaded H-bridge multilevel converter 10 in accordance with an exemplary embodiment of the present invention.
Figure 10:
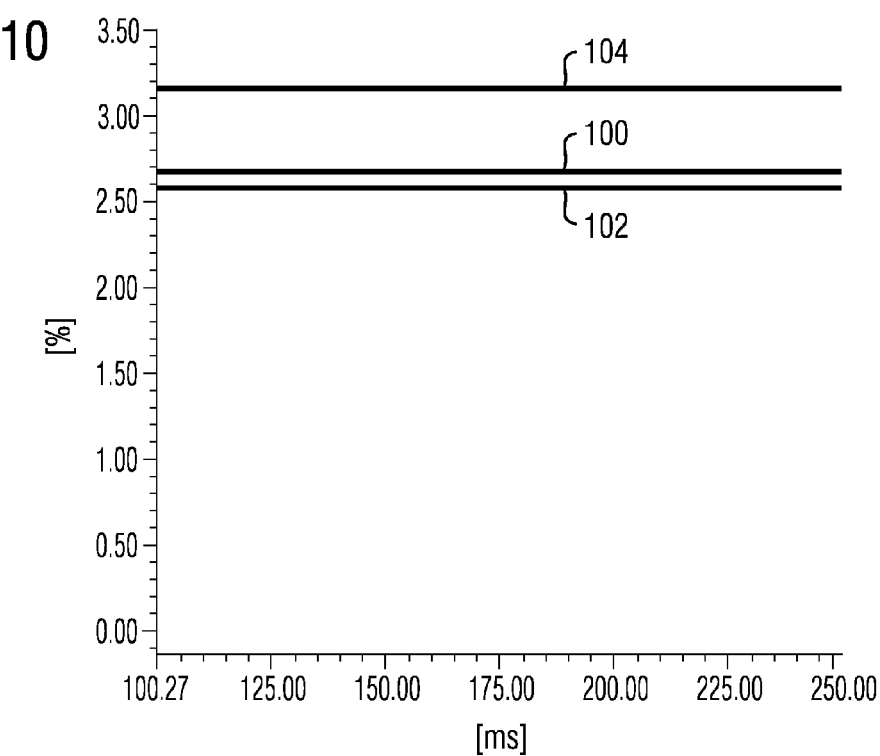

FIG. 9 and FIG. 10 illustrate graphical representations of simulated input currents obtained with PSPWM in a cascaded H-bridge multilevel converter 10 in accordance with an exemplary embodiment of the present invention. FIG. 9 illustrates simulated input currents 90, 92, 94 in a cascaded H-bridge multilevel converter 10 for a three-phase-system comprising for example phases A, B and C. Each phase A, B, C comprises two power cells 12, i.e., N=2, with one high voltage cell and one low voltage cell per phase A, B, C (see FIG. 2), input currents 90, 92 and 94 referring to a primary transformer current, i.e. the drive input current. FIG. 10 illustrates simulated input currents THD (Total Harmonic Distortion) 100, 102, 104 obtained with PSPWM in the cascaded H-bridge multilevel converter 10 corresponding to the input currents shown in FIG. 9. Input current THD 100 corresponds to input current 90, input current THD 102 corresponds to input current 92, and input current THD 104 corresponds to input current 94. FIGS. 9-10 depict the input currents 90, 92, 94 and the input currents THD 100, 102, 104 at full load, respectively. FIG. 10 indicates that the input currents THD 100, 102, 104 are below 5% as required by standard IEEE 519.

Figure 11:
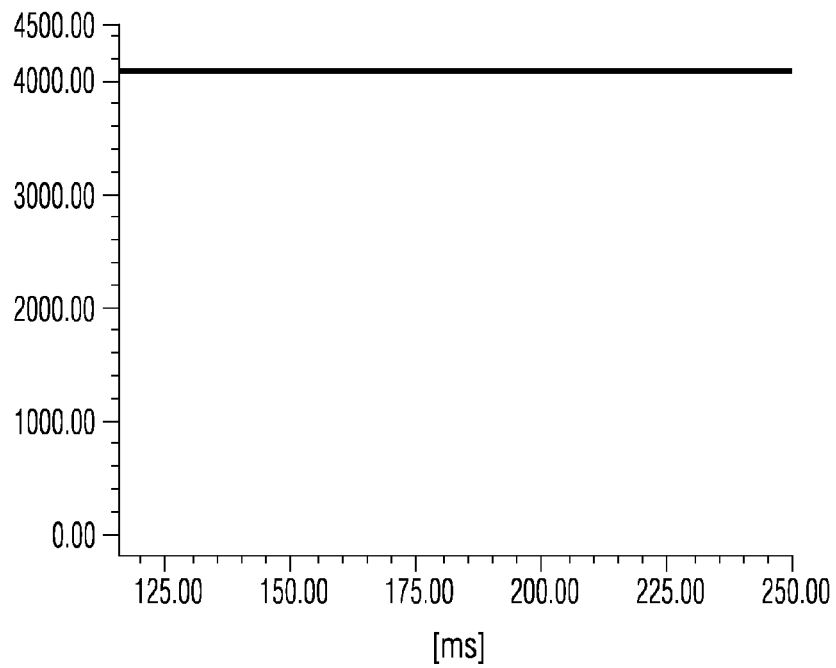
FIG. 11 and FIG. 12 illustrate graphical representations of simulated output line-line RMS (Root Mean Square) voltage and output current RMS obtained with PSPWM in a cascaded H-bridge multilevel converter 10 in accordance with an exemplary embodiment of the present invention.
Figure 12:
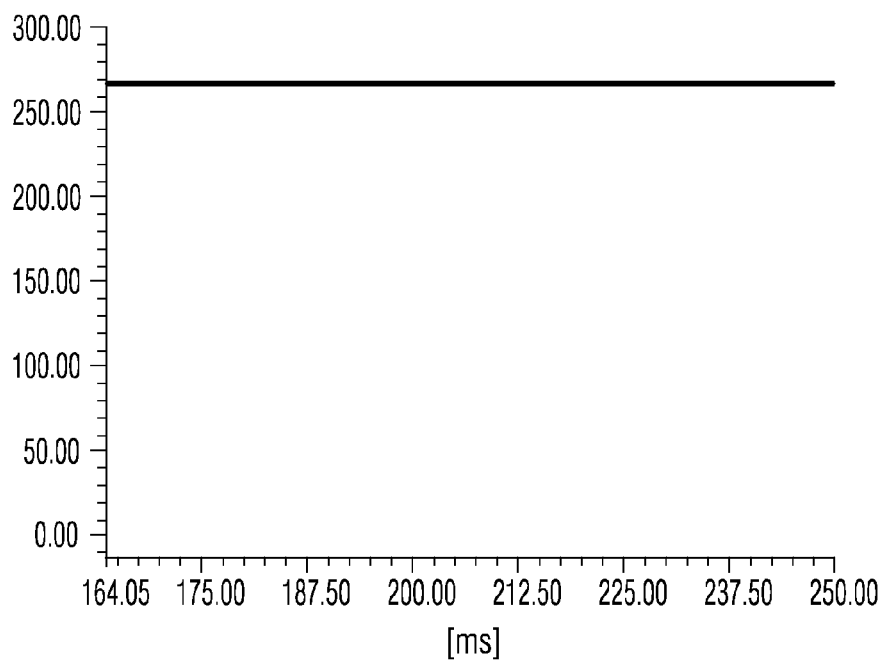

FIG. 11 and FIG. 12 illustrate graphical representations of simulated output line-line RMS (Root Mean Square) voltage and output current RMS obtained with PSPWM in a cascaded H-bridge multilevel converter 10 in accordance with an exemplary embodiment of the present invention. FIGS. 11-12 show the RMS values of the output line-line voltage and output current (see FIGS. 7-8), respectively, at maximum output voltage, for example 4.16 kV/60 Hz.

Figure 13:
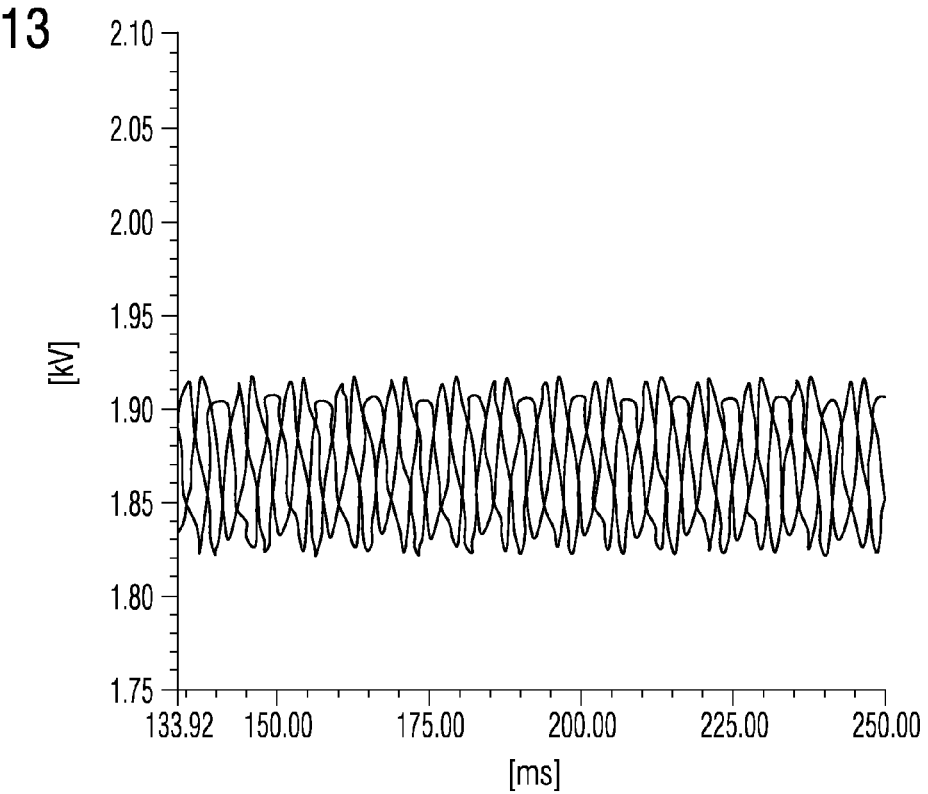
FIG. 13 and FIG. 14 illustrate graphical representations of simulated DC-link voltages of high voltage cells and low voltage cells obtained with PSPWM in a cascaded H-bridge multilevel converter 10 in accordance with an exemplary embodiment of the present invention.
Figure 14:
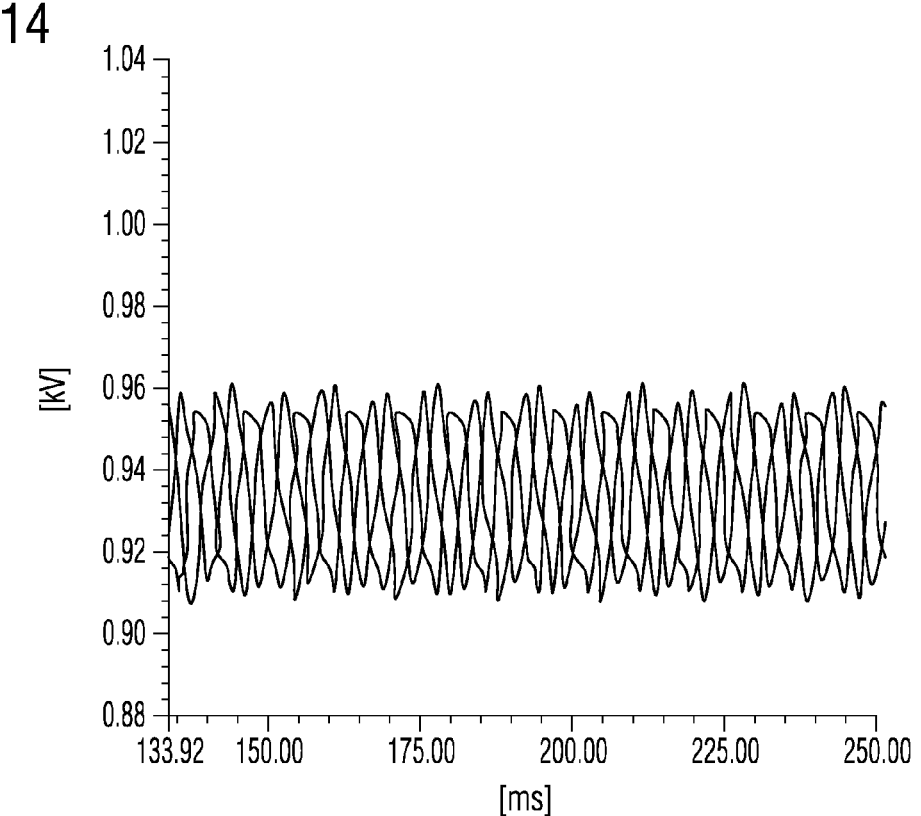

FIG. 13 and FIG. 14 illustrate graphical representations of simulated DC-link voltages of high voltage cells (FIG. 13) and low voltage cells (FIG. 14) obtained with PSPWM in a cascaded H-bridge multilevel converter 10 in accordance with an exemplary embodiment of the present invention. FIGS. 13-14 show DC-link voltages of the high voltage and low voltage cells 12, respectively, while operating at maximum output power.

Summarizing, according to exemplary embodiments, the cascaded hybrid multilevel converter 10 as described herein comprises the following features:

All power cells 12 comprise identical topology including a single phase H-bridge inverter with a diode front end rectifier. Power cells 12 of one phase are connected in series.

A voltage rating of first power cells 12 is higher than the voltage rating of second power cells 12. On each phase A, B, C, there are (N−1) first power cells 12 with a voltage rating of 2V (high voltage cell), and only one second power cell 12 with a voltage rating of V (low voltage cell). It should be noted that the one power cell 12 with a low voltage rating can be arranged at any place within a phase A, B, C, i.e., the low voltage rating power cell 12 can be the first, the last, or any other power cell 12 within one phase.

The first and second power cells 12 each output a plurality of voltage levels, the first power cells outputting more voltage levels than the second power cells. All power cells 12 are switched at a same switching frequency. Each high voltage cell, i.e., first power cell 12, outputs three levels (+2V, 0, −2V) and each low voltage cell, i.e. second power cell 12, outputs only two levels (+V, −V). In particular, the voltage rating of a second power cell is 50% of the voltage rating of a first power cell of a phase A, B, C.

Each power cell 12 is modulated using a new phase-shifted pulse width modulating (PSPWM) scheme. The described PSPWM scheme ensures that an overall switching ripple of phase voltage corresponds to $$F_{EQUIVALENT} = (2N-1) \cdot F_S \quad (2)$$

where (N−1) is the number of high voltage cells per phase A, B, C, and $F_s$ is the switching frequency of all power cells 12, i.e., low and high voltage power cells 12. Output voltage only comprises steps with a magnitude of 2V. Using the proposed PSPWM scheme, phase output voltage has 2*N levels, always an even number, wherein N is the number of all power cells 12.

Using the PSPWM scheme, a plurality of carrier signals comprises a waveform having a substantially triangular shape, and a reference signal comprises a waveform having a substantially sinusoidal shape. First power cells and second power cells 12 each comprise first and second switching legs with a plurality of switching devices Q1-QN. First and second switching legs of each first power cell 12 use separate carrier signals, the reference signal for the second switching leg being inverted with respect to the reference signal of the first switching leg. First and second switching legs of each second power cell 12 use a same carrier signal.

A phase shift $T_{shift}$ between the plurality of carrier signals of the first and second power cells 12 of a phase A, B, C of the multilevel converter is $$T_{shift} = \frac{F_S}{2 \cdot (2 \cdot N - 1)},$$

where (N−1) is number of first power cells and $F_S$ is the switching frequency.

An 18-pulse transformer with multiple windings provides isolated voltage to each power cell 12. All cells 12 of one phase A, B, C are powered up from the transformer windings with a same phase shift. For example, all power cells 12 on phase A comprise transformer windings with 20 degrees phase shift, all power cells 12 on phase B comprise transformer windings with 0 degrees phase shift and all power cells 12 on phase C comprise transformer windings with −20 degrees phase shift (see FIG. 2).

An example of a cascaded multilevel converter as described herein is part of the Perfect Harmony GH180 ® drive manufactured by Siemens Industry, Inc.

The proposed design of a cascaded multilevel converter 10 as described herein provides for example:

Reduced overall cost of an electric drive system 1 by reducing the number of power cells 12 required for a certain voltage.

Combining a low voltage cell and a number of high voltage cells 12 allows further optimization and cost reducing compared to using only high voltage cells.

The proposed control method PSPWM essentially simply comprises a different phase shifting for the three phases A, B, C, wherein a distinction is to be made between the two types of power cells 12.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A multilevel converter comprising:
a power supply assembly comprising a plurality of phases,
a power cell assembly comprising first power cells and second power cells, the first power cells and second power cells comprising a same topology and a same current rating, and
a transformer operably coupled to the first and second power cells,
wherein the first power cells and the second power cells are configured to supply power to the plurality of phases of the power supply assembly, and
wherein each phase of the plurality of phases comprises at least one first power cell and a second power cell of the power cell assembly,
wherein a voltage rating of the first power cells is higher than a voltage rating of the second power cells, and
wherein the first and second power cells are configured to output a plurality of voltage levels, the first power cells being configured to output more voltage levels than the second power cells, wherein the transformer is configured to provide isolated voltage to each first and second power cells, wherein the voltage provided to the first and second power cells is provided with phase shifts.

2. The multilevel converter of claim 1, wherein each phase of the plurality of phases comprises one second power cell and at least one first power cell, the voltage rating of the one second power cell being 50% of the voltage rating of the at least one first power cell.

3. The multilevel converter of claim 1, wherein a pulse width modulation controller is operably coupled to each of the first and second power cells for controlling switching events of the first and second power cells by pulse width modulation, wherein the first power cells and the second power cells are switched at a same switching frequency.

4. The multilevel converter of claim 3, wherein each power cell comprises at least one switching leg incorporating semiconductor switches, and the pulse width modulation controller controls switching events of the at least one switching leg.

5. The multilevel converter of claim 1, wherein the first and second power cells of a phase comprise transformer windings with a same phase shift.

6. The multilevel converter of claim 1, wherein the first and second power cells of a phase are connected in series, the first and second power cells comprising the same topology comprising a single phase H-bridge inverter comprising a diode front end rectifier.

7. An electric drive system comprising:
a power source;
a multilevel converter coupled to the power source for producing a multi-phase power supply, the converter comprising:
a power supply assembly comprising a plurality of phases producing the multiphase power supply, and
a transformer operably coupled to the first and second power cells, and
a power cell assembly comprising first power cells and second power cells, the first power cells and second power cells comprising a same topology and a same current rating, the first power cells and the second power cells configured to supply supplying power to the plurality of phases of the power supply assembly, and
each phase of the plurality of phases comprising at least one first power cell and a second power cell of the power cell assembly, voltage ratings of the first power cells and the second power cells being different,
wherein the voltage rating of the first power cells is higher than the voltage rating of the second power cells,
wherein the first and second power cells are configured to output a plurality of voltage levels, the first power cells configured to output more voltage levels than the second power cells,
wherein the electric drive system further comprises a load, an output of the multi-phase power supply being connected to the load comprising an electric machine, the electric machine comprising a medium-voltage AC motor operating in a range of 4.16 kV to 13.8 kV,
wherein the transformer is configured to provide isolated voltage to each first and second power cells, wherein the voltage provided to the first and second power cells is provided with phase shifts.

8. The electric drive system of claim 7, further comprising:

a pulse width modulation controller operably coupled to each of the first and second power cells for controlling switching events of the first and second power cells by pulse width modulation.

\* \* \* \* \*